Patented Mar. 1, 1938

2,109,708

UNITED STATES PATENT OFFICE 2,109,708

REDUCING COMPOSITION

Alfred Pfister, Englewood, N. J.

No Drawing. Application December 1, 1936,
Serial No. 113,615

7 Claims. (Cl. 8—6)

The present invention relates to improvements in hydrosulphite and sulphoxylate compositions and also relates to a novel process for producing such compositions.

Sodium formaldehyde hydrosulphite, or as it is more commonly termed "sodium sulphoxylate" is generally prepared by reacting together or boiling a mixture of sodium bisulphite, zinc dust, formaldehyde and water followed by filtration away of the zinc residue and concentration of the filtrate. Sodium hydrosulphite is similarly prepared without including the formaldehyde.

The solutions obtained are then boiled down in a vacuum evaporator until they can be solidified and the final materials, testing over 90% of hydrosulphite or sulphoxylate and dissolving to clear solutions in water, are sold under various trade names.

Among these various trade names are the following, Rongalite C (BASF), Hydraldite C (Cassella), Hydrosulphite AWC (J. W. & Co.), Discolite (Royce Chemical), Hydrosulphite N. F. (conc) (IG) and Sulphoxite C (duP).

The hydrosulphite or sulphoxylate thus sold is in solid form and is widely utilized in discharge pastes in connection with textile printing processes.

However, the sulphoxylate or hydrosulphite composition is not too readily miscible with the pasty composition utilized for printing, and generally, considerable difficulty is experienced in obtaining a thorough dispersion of the sulphoxylate or hydrosulphite composition in the particular discharge printing paste which may be utilized.

It is among the objects of the present invention to provide an improved sulphoxylate or hydrosulphite composition which may be produced by no greater expense than the previous solid compositions mentioned above and which will be of equal efficacy, as a reducing or stripping agent, and which, at the same time, will be most readily miscible and soluble in paste mixtures, enabling satisfactory dispersion of the sulphoxylate or hydrosulphite throughout a discharging printing paste or other reducing combination.

Another object is to provide a novel process of manufacturing sodium hydrosulphite, sodium formaldehyde hydrosulphite or sodium sulphoxylate to produce a material in a miscible or dispersible form so that it may be generally utilized for discharge printing pastes and other reducing combinations.

Other objects will be obvious or will appear during the course of the following specification.

To give one example of making sodium formaldehyde hydrosulphite or sodium sulphoxylate, to which, however, the present invention is by no means restricted, water in the amount of 3700 pounds, sodium bisulphite powder in the amount of 2580 pounds, zinc dust in the amount of 2650 pounds, 40% formaldehyde or formalin in the amount of 2025 pounds and ice in the amount of 600 pounds are mixed together and then caused to react in one or more steel jacketed kettles provided with agitators.

To make the sodium hydrosulphite itself, sulphur dioxide may be bubbled into a solution of sodium carbonate containing powdered or finely divided zinc.

The material is kept in these jacketed kettles for about six hours until the reaction is completed and until the conversion into the sulphoxylate has reached a maximum.

The liquid reaction mixture containing about 47% of the sulphoxylate is then filtered and the filtrate will amount to 5000 to 5500 pounds.

This filtrate is then evaporated down from about 30% of sulphoxylate to between 50 to 85% of sulphoxylate and before, during or after this evaporation, there is added to the filtrate, a water soluble thickening agent or gum as may be desired and it is generally preferable also to add a hygroscopic agent which may be the same as the gum or thickening agent, which agent may also act as a protective agent to prevent oxidation or decomposition of the reducing materials on contact with air in storage.

Among the gums or water soluble thickening or anti-crystallizing agents which may be added are gum arabic, gum tragacanth, gum karaya, gum shiraz, locust bean gum, dextrine, ethyl cellulose or other water soluble cellulose ethers, cerelose, glucose, glycerol, sugars, glycol ethers, Irish moss, emulsified or sulphonated fats, oils and waxes, starches, glue gelatine, and so forth, the latter agents being most desirably employed as colloidal agents in addition to the first named agents which are primarily thickening materials.

The final material, which is produced by evaporation of the 30% sulphoxylate solution in the presence of the thickening material, and also, if desired, the hygroscopic agent may either be a thin or thick syrupy liquid or a readily soluble pasty material or a solid readily dispersible powder.

This material may contain from 50% to 85% of the sodium hydrosulphite or sulphoxylate, 1 to 5% of water soluble gums and the residue water.

Where the material is to be utilized in the form of a powder, the gums, thickening or anti-crystallizing agents will form protective coatings around the hydrosulphite or sulphoxylate particles.

As examples of other compositions, it is possible to prepare a satisfactory composition of 85% hydrosulphite, 7½% glucose and 7½% of gum arabic.

A suitable powdered composition is one containing 90% of hydrosulphite or sulphoxylate, 5% of cerelose and 5% of starch.

To give an example of one type of composition which may be prepared, it has been found satisfactory to sell and utilize a composition containing 75% of sodium sulphoxylate, 2% of gum arabic and 23% of water.

These compositions may be most readily mixed with discharge printing pastes or stripping compositions.

The composition produced according to the present invention differs quite remarkably from compositions which may have been prepared by mixing together the thickening agent, the water and hydrosulphite or sulphoxylate which has previously been reduced to dryness by evaporation of the reaction mixture.

In the composition of the present application, the hydrosulphite and sulphoxylate appear to be in much more active condition and to be more stable than when the hydrosulphite and sulphoxylate have been first reduced to dryness before incorporation in the composition. Moreover, it has been found that the hydrosulphite and sulphoxylate are in a much better state of dispersion in the gummy or thickened composition.

It is to be understood that the invention is not intended to be restricted to any particular example, composition or proportions, or to any particular application, or to any specific manner of use or to any of various details thereof, herein described, as the same may be modified in various particulars or be applied in many varied relations without departing from the spirit and scope of the claimed invention, the practical embodiments herein described merely showing some of the various features entering into the application of the invention.

What is claimed is:

1. A process of making a viscous and pasty alkali metal sulphur salt composition, said salt being selected from the group consisting of the hydrosulphites and sulphoxylates which comprises forming the salt in a relatively large quantity of water, adding a thickening agent to the aqueous mixture and then evaporating until a viscous, pasty mass is obtained and stopping the evaporation short of dryness.

2. A process of making a pasty or viscous readily dispersible concentrated composition of a reducing alkali metal sulphur acid salt selected from the group consisting of alkali metal hydrosulphites and alkali metal sulphoxylates which comprises reacting together a sulphite and a reducing agent to form the salt, said reaction taking place in the presence of a relatively large quantity of water, filtering, adding a thickening agent and then evaporating until the reaction mixture becomes viscous or pasty.

3. A process of making a viscous and pasty alkali metal hydrosulphite composition which comprises forming the hydrosulphite in a relatively large quantity of water, adding a thickening agent, then evaporating until a viscous pasty mass is obtained and stopping the evaporation short of dryness.

4. A process of making a viscous and pasty alkali metal sulphoxylate composition which comprises forming the sulphoxylate in a relatively large quantity of water, adding a thickening agent, then evaporating until a viscous pasty mass is obtained and stopping the evaporation short of dryness.

5. A process of making a pasty or viscous, readily dispersible concentrated sodium sulphoxylate composition which comprises reacting together sodium bisulphite, formaldehyde and zinc dust, in the presence of water, filtering, adding a thickening agent and then evaporating until the reaction mixture becomes viscous or pasty.

6. A process of making a viscous and pasty sodium sulphoxylate composition which comprises forming sodium sulphoxylate by the reaction of sodium bisulphite, formaldehyde and zinc dust in the presence of water, filtering, adding a gummy thickening agent to the filtrate and then evaporating until a viscous, pasty mass is obtained.

7. A process of making a viscous, pasty, stable sodium hydrosulphite composition which comprises providing a relatively dilute reaction mixture containing sodium hydrosulphite, adding a gummy thickening agent thereto, and evaporating in a vacuum until a gummy viscous mass is produced.

ALFRED PFISTER.